J. McNAMEE.
STARTING DEVICE.
APPLICATION FILED AUG. 15, 1910.
1,021,939.
Patented Apr. 2, 1912.
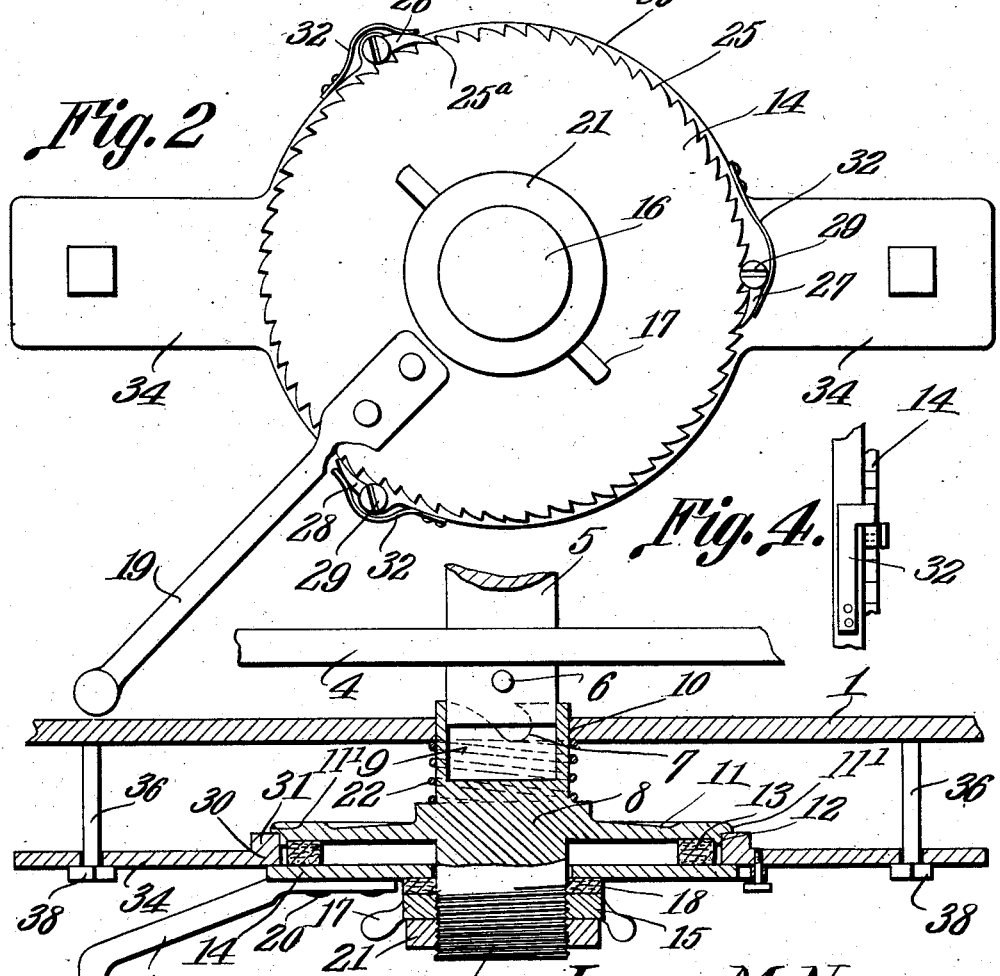
James McNamee
Inventor,
by C. A. Snow & Co.
Attorneys.
Witnesses
J. R. Tomlin
W. H. C. Clarke.

UNITED STATES PATENT OFFICE.

JAMES McNAMEE, OF AMSTERDAM, NEW YORK.

STARTING DEVICE.

1,021,939.  Specification of Letters Patent.  Patented Apr. 2, 1912.

Application filed August 15, 1910. Serial No. 577,254.

*To all whom it may concern:*

Be it known that I, JAMES MCNAMEE, a citizen of the United States, residing at Amsterdam, in the county of Montgomery and State of New York, have invented a new and useful Starting Device, of which the following is a specification.

This invention relates to starting devices for automobiles and the like.

The principal object of the invention is to prevent the dangerous back-lash or kick which sometimes occurs in starting the compression engine with the ordinary crank handle.

Further objects of the invention are generally to improve and simplify the construction of starting mechanisms as well as to increase the efficiency thereof and to decrease the expense attending the manufacture and maintenance of such devices; furthermore, to reduce to a minimum the strain on the mechanism due to back-lash, and consequently to prolong the life and efficiency thereof, and to prevent injury to the person cranking the engine in the event of back-lash.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of the claims without departing from the spirit of the invention.

In the accompanying drawing forming part of this specification, Figure 1 is a front elevation of a portion of a motor car equipped with the improvements of the present invention. Fig. 2 is an enlarged detail view of the improvements in elevation. Fig. 3 is a horizontal section through the construction illustrated in Figs. 1 and 2. Fig. 4 is a detail view looking at the edge of the toothed friction member, showing one of the pawls.

Like reference numerals indicate corresponding parts in the different figures of the drawing.

The reference numeral 1 indicates the forward frame of a motor car and 2—2 the springs thereof, the numeral 3 representing the forward end of the engine structure or radiator.

As shown best in Fig. 3, the numeral 4 indicates a portion of the engine frame or base and 5 designates the main shaft of the engine. In the embodiment of invention illustrated, the shaft 5 is provided with a transversely extending pin 6 which is adapted to be engaged by the cut away portions or slots 7 formed in the rear end of a clutch member or stud shaft 8. The clutch member 8 at its rear end is provided with a chamber 9 which is adapted to receive or fit over the forward end of the main engine shaft 5. The clutch member 8 extends through an opening 10 formed in the front frame 1 of the car. Fixed in any suitable manner upon the clutch member 8 is a friction member or disk 11 which is formed or provided at the outer edge thereof with an annular rim or flange 12. Mounted upon the disk 11 in any suitable manner is an annular washer 13 which is formed of leather or other suitable material. Bearing against the annular washer 13 is a friction member or disk 14 which loosely surrounds the clutch member 8 and is adapted to be pressed frictionally into engagement with the washer 13 by means such as the nut 15 which is mounted upon the threaded end 16 of the clutch member 8 and is either angularly formed to receive a wrench or is provided with wings 17 by means of which it may be tightened up against a washer 18 formed of leather or other suitable material and interposed between the nut 15 and the friction member 14. By tightening the nut 15 the disk 14 is pressed tightly into engagement with the annular washer 13 whereby the rotary movement which is transmitted to the outer disk 14 by means of the crank handle 19 bolted or otherwise suitably secured thereto as indicated at 20 is transmitted to the disk 11 and through said disk to the clutch member 8 and main engine shaft 5. For the purpose of locking the nut 15 upon the clutch member 8 after it has been adjusted to the proper position, a lock nut 21 is mounted upon the threaded portion 16 of the clutch member 8 as shown.

The clutch member 8 is held normally out of engagement with the transverse pin 6 of the engine shaft 5 by means such as the coiled spring 22 which surrounds the clutch member 8 and bears at one end against the friction member 11 and at the other end against the front portion 1 of the car frame.

For the purpose of preventing reverse movement of the friction member or disk 14 in the event that back lash of the engine should occur, the friction disk 14 is provided on its periphery or edge with a plurality of ratchet teeth 25 which are engaged by a plurality of equi-distantly arranged pawls 26, 27, and 28 which are pivotally mounted on fulcrum members 29 threaded into a pawl supporting member 30 which is annular in shape and is provided with a rearwardly extending rim or flange 31 in which the friction member 11 is rotatably mounted. Each of the pawls 26, 27 and 28 is provided with a spring 32 which holds it yieldingly in engagement with the ratchet teeth 25. The pawl supporting member 30 is provided with oppositely extending arms 34 which are slidably engaged with bolts 36 set into the forward member 1 of the car frame and having heads 38 which prevent disengagement of the supporting arms 34. The supporting arms 34 are adapted to slide rearwardly on the bolts 36 when the clutch member 8 is pressed into engagement with the engine shaft 5.

An inspection of Fig. 2 of the drawing shows that three pawls are employed to engage the ratchet teeth 25 and that these pawls are so arranged as to engage different portions of the different ratchet teeth. For example, the pawl 26 is fully engaged with the inner shoulder 25$^a$ of the ratchet tooth; the pawl 27 is removed by a distance equal to one-third of the length of the ratchet tooth, from the inner end thereof; and the pawl 28 is removed by a distance equal to two-thirds of the length of the ratchet tooth from the inner shoulder thereof. The result is, that no matter what the position of the friction disk 14 may be, it only requires a rearward movement thereof for a distance equal to one-third of the length of one of the ratchet teeth 25 to cause one of the pawls to engage said disk and prevent further rearward movement thereof. For this reason, the friction disk 14 cannot be moved rearwardly far enough to gather sufficient momentum to cause any danger of breaking one of the pawls. Moreover, the backward movement of the crank, incident to back lash, is reduced to a minimum.

Constructed as described, the operation of the invention is as follows: The nut 15 is first tightened so as to produce enough friction between the disk 14 and the leather mounting of the disk 11 to cause rotation imparted to the disk 14 to be transmitted through the disk 11 and clutch member 8 to the engine shaft 5. In other words, the friction members 11 and 14 are tightened sufficiently not to slip when an attempt is made to crank the engine. Preparatory to cranking, the clutch member 8 together with the disks 11 and 14 and pawl supporting arms 34, is pushed rearwardly, against the tension of the spring 22, in the usual manner, until the slots 7 engage the cross pin 6 of the main shaft 5. Rotation imparted to the crank handle 19 will then be transmitted through the disk 14 to the leather mounted disk 11 and from disk 11 through the clutch 8 to the main shaft 5. Rotation in one direction of the disk 14 in cranking the engine is permitted by the pawls 26, 27 and 28. Should back lash occur, a rearward movement of the disk 14 equal to one-third of the length of one of the teeth 25, would cause one of three pawls to catch and thus prevent any further rearward movement of the disk 14 and consequently of the crank handle 19. It is very important that one of the pawls should act quickly, for the reason that when the rearward friction disk 11 is moving under the rapid impulse of the back lash, and the disk 14 is held practically stationary, the two disks engaged at the leather mounting 13 slip relatively to each other much easier than would be the case if the disk 14 were permitted to move for a certain distance with the disk 11 and then stop. In other words, when two parts are frictionally engaged, relative movement therebetween can be produced much more easily by a sharp movement or impulse than by a slow movement or impulse of practically equal strength.

It will be noted that the friction disks 11 and 14 are relatively large and that the frictional engagement therebetween is at the outer portions or peripheries thereof. This arrangement of disks provides a large friction surface between the disks and also produces a long leverage from the periphery of the friction members to the center of the clutch 8 which with the yielding mounting 13 produces not only a firm friction, but also one that can be estimated and measured with much accuracy and controlled with much ease and precision by means of the parts shown.

The device of the present invention is strong, simple, durable and comparatively inexpensive in construction as well as thoroughly practical in operation.

The reference numeral 11′ indicates a collar secured to the rear face of the friction member 11 for preventing said collar from being moved far forward under the action of the spring 22.

What is claimed as new is:—

1. In a starting device, the combination with the engine shaft and clutch member having interlocking parts, of spring means for normally separating said parts, a friction disk fixed on said clutch member, a friction disk loosely surrounding said clutch member, a crank handle fixed on said last mentioned disk, means adjustably mounted on said clutch member for tightening said disks, a pawl supporting member mounted adjacent said friction disk and being movable toward and away from said engine shaft, and pawls mounted upon said pawl supporting member and engaging different portions of the periphery of said last mentioned friction disk, there being ratchet teeth upon said friction disk.

2. A starting device comprising an engine shaft having a pin thereon, a clutch member having slots adapted to engage said pin, a coil spring for holding said clutch member normally out of engagement with said pin, a disk fixed on said clutch member, a second disk loose on said clutch member, a nut threaded on said clutch member for pressing said disks together, a crank handle fixed on said second disk, there being ratchet teeth on the periphery of the second disk, a pawl supporting member surrounding said disk and having arms, said pawl supporting member being movable toward and from said engine shaft, and pawls mounted on said pawl supporting member and engaging different portions of different ratchet teeth on said second disk.

3. In a starting device, the combination with the engine shaft and clutch member having interlocking parts, of spring means for normally separating said parts, a friction disk fixed on said clutch member, a friction disk loosely surrounding said clutch member, leather friction material interposed between said disks, a crank handle fixed on said last mentioned disk, means adjustably mounted on said clutch member for tightening said disks, a pawl supporting member mounted adjacent said friction disk and being movable toward and away from said engine shaft, and pawls mounted upon said pawl supporting member and engaging different portions of the periphery of said last mentioned friction disk, there being ratchet teeth upon said friction disk.

In testimony that I claim the foregoing as my own, I have hereto affixed my signature in the presence of two witnesses.

JAMES McNAMEE.

Witnesses:
ARTHUR E. WELLS,
A. C. DARDIS.

---

Copies of this patent may be obtained for five cents each, by addressing the "Commissioner of Patents Washington, D. C."